United States Patent
Wei et al.

(10) Patent No.: US 8,131,117 B2
(45) Date of Patent: *Mar. 6, 2012

(54) METHOD FOR MAGNIFYING IMAGES AND VIDEOS AND ASSOCIATED IMAGE PROCESSING DEVICE

(75) Inventors: Kai Wei, Hangzhou (CN); Hao Huang, Hangzhou (CN); Pengfei Li, Hangzhou (CN); Jin Wang, Hangzhou (CN)

(73) Assignee: Arcsoft Hangzhou Co. Ltd. (CN)

( * ) Notice: Subject to any disclaimer, the term of this patent is extended or adjusted under 35 U.S.C. 154(b) by 107 days.

This patent is subject to a terminal disclaimer.

(21) Appl. No.: 12/800,352

(22) Filed: May 12, 2010

(65) Prior Publication Data
US 2010/0225646 A1    Sep. 9, 2010

Related U.S. Application Data

(63) Continuation of application No. 12/318,370, filed on Dec. 29, 2008.

(51) Int. Cl.
*G06K 9/40* (2006.01)
*G06K 9/32* (2006.01)
*G06K 9/36* (2006.01)
*G09G 5/00* (2006.01)
*H04N 1/393* (2006.01)
*H04N 5/44* (2006.01)
*H04N 9/74* (2006.01)

(52) U.S. Cl. ........ 382/300; 382/263; 382/276; 382/298; 345/660; 358/451; 348/561; 348/581

(58) Field of Classification Search ........................ None
See application file for complete search history.

(56) References Cited

U.S. PATENT DOCUMENTS
5,471,572 A * 11/1995 Buchner et al. ................ 345/671
6,407,747 B1 * 6/2002 Chui et al. .................... 345/660
(Continued)

*Primary Examiner* — Michelle Entezari (57) ABSTRACT

This invention is a method applicable to an image processing device, which includes the steps of providing a preprocess module for extracting a high-frequency portion of an image inputted into the device, extracting a gradient of the image and decomposing the image into plane and edge regions according to a predetermined fixed threshold, and providing a composite up-scaling module for executing the magnification processes on the image and the high-frequency portion thereof respectively, wherein the magnification process of plane regions of the image and the high-frequency portion is based on a simple interpolation while the edge regions of the image and the high-frequency portion is based on both a smart interpolation and the simple interpolation. The magnification results of the image and the high-frequency portion are then processed by a fusion process, so as to output an image having sharp but not blocky edges, rich details and strong contrast.

7 Claims, 9 Drawing Sheets

U.S. PATENT DOCUMENTS

| | | | |
|---|---|---|---|
| 6,411,305 B1 * | 6/2002 | Chui | 345/660 |
| 6,711,298 B1 * | 3/2004 | Amonou | 382/240 |
| 7,054,507 B1 * | 5/2006 | Bradley et al. | 382/300 |
| 7,123,781 B2 * | 10/2006 | Maenaka et al. | 382/300 |
| 7,561,204 B1 * | 7/2009 | Honda | 348/448 |
| 7,944,503 B1 * | 5/2011 | Zhai et al. | 348/452 |
| 2002/0028028 A1 * | 3/2002 | Michel | 382/299 |
| 2002/0181762 A1 * | 12/2002 | Silber | 382/154 |
| 2003/0086608 A1 * | 5/2003 | Frost et al. | 382/173 |
| 2006/0139376 A1 * | 6/2006 | Le Dinh et al. | 345/660 |
| 2007/0140350 A1 * | 6/2007 | Sakazume et al. | 375/240.21 |
| 2008/0144952 A1 * | 6/2008 | Chen et al. | 382/239 |

* cited by examiner

METHOD FOR MAGNIFYING IMAGES AND VIDEOS AND ASSOCIATED IMAGE PROCESSING DEVICE

REFERENCE TO RELATED APPLICATION

This application is a continuation-in-part of application with Ser. No. 12/318,370, filed Dec. 29, 2008.

BACKGROUND OF INVENTION

1. Field of the Invention

The present invention relates to a method for magnifying images and videos, more particularly a method applicable to an image processing device and capable of magnifying a low resolution digital image inputted into the image processing device and then outputting and displaying the magnified digital image having higher clarity, better visual effect, sharper edges, less blocky edges, richer details and stronger contrast on a high resolution display device.

2. Description of the Prior Art

Recently, various digital photographing devices (such as digital cameras and video cameras) are continuously developed and improved. With their constantly enhanced image quality, ever-reducing product size, and steadily lowering prices, the digital photographing devices are more and more popular, and become indispensable tools for many people in their daily lives and at work. For example, a mobile phone having a photographing function is generally provided with a CCD or CMOS image capturing unit for capturing images, and a small LCD screen for showing the captured images to a user. Generally, when the mobile phone is used to photograph a scene, the images taken are stored in a memory card inserted in the mobile phone. Then, when the user selects an image listed on the LCD screen of the mobile phone, the mobile phone reads the selected image from the memory card and re-encodes the selected image into a minified image (i.e., a thumbnail) for display on the LCD screen, allowing the user to execute various operations (such as minification, magnification, drag, or page-size adjustment) to the minified image on the LCD screen. Normally, the size of an image stored in a digital photographing device may be several megabytes (such as 1.2 MB) or hundreds of kilobytes (such as 120 KB), and the image is stored in a storage device (such as a memory card, a hard disk, or a flash drive) of the digital photographing device. Once the user selects the image, the digital photographing device reads the image from the storage device and re-encodes the original image into a minified image having a smaller size of about tens of kilobytes (such as 75 KB) or several kilobytes (such as 7.5 KB) for display on a small LCD screen, so that the user can browse the minified image and execute various operations (such as minification, magnification, drag, or page-size adjustment) to the minified image according to actual needs.

As the image resolution and the capturing speed of digital photographing devices are continuously increased, a variety of digital photographing devices have been widely used in various professional fields including criminal investigation, biological research, medical science, astrology, etc., for preserving important evidence, such as key clues in criminal cases, exhibits for use as evidence, and images at crime scenes; new findings or experimental results in biological science; and medical X-ray images, computerized tomography images, and other data helpful for diagnosis by medical workers. Therefore, it is an important issue for researchers in each professional field to figure out how to preserve critical evidence in laboratories or in other research fields and save the evidence in a digital image format, so as to facilitate review or comparison of important data in subsequent experiments or researches. It is also important to effectively decrease the distortion of digital images during magnification, so that the digital images displayed have high resolution and are easy to identify, thereby enabling analysis and determination of characteristics shown in the digital images.

Furthermore, after conducting researches on the technologies for magnifying images and videos for years, image processing professionals and relevant designers have developed various new theories and applications continuously, from the initial linear magnification to the later edge-based magnification, wherein frequently used linear magnification techniques include bilinear interpolation, bicubic interpolation, Lanzcos algorithm, etc., while a typical example of edge-based magnification is the new edge-directed interpolation (NEDI). However, there are still some shortcomings in the foregoing magnification techniques. For example, the linear magnification tends to cause a blocky-edge effect, loss of details, and blurry edges. On the other hand, the edge-based magnification, in which interpolation is executed along image edges along a gradient direction to partly solve the problems of blocky or blurry edges, tends to produce incorrect interpolation results, especially in an image region having rich details and messy edges, due to an inaccurate edge direction as the edge-based magnification is highly dependent on the accuracy of the edge direction. Moreover, the edge-based magnification relies on a considerable amount of calculation to maintain the accuracy of results, but the efficiency of image processing may be lowered accordingly. Finally, since most of the traditional magnification techniques use weighted summation of neighborhood pixels to perform interpolation, in which the weighted summation produces a low-pass filtering effect on the original image, some sharpness and detail information (i.e., the high-frequency portion) of the original image is inevitably lost after the original image is magnified. Therefore, in order to recover the quality of the original image, image processing professionals usually perform certain enhancement and restoration processes on the magnified image. However, the enhancement and restoration processes result in new defects such as overshoot and the ringing effect.

Therefore, it is important for image processing professionals and relevant designers to develop a new technology for magnifying images, so that when low-resolution images and videos are magnified and shown on a high-resolution video-frequency apparatus, clear digital images are displayed to facilitate identification of characteristics shown in the images.

SUMMARY OF INVENTION

In order to overcome the shortcomings of the aforementioned traditional techniques for magnifying images, the inventor of the present invention conducted extensive research and finally succeeded in developing a method for magnifying images and videos as disclosed herein.

A primary object of the present invention is to provide a method for magnifying images and videos, which is applicable to an image processing device and whereby the image processing device outputs a magnified digital image according to a predetermined magnification ratio after a digital image is input into the image processing device. The method includes the steps of: providing a preprocess module and providing a composite up-scaling module, wherein the preprocess module executes a high-pass filtering process on the input image for extracting a high-frequency portion thereof, which high-frequency portion is used to perform high-frequency compensation on the magnified image, and the preprocess module further executes an image decomposition process on the input image for extracting a gradient of the input image by means of a gradient operator and for decomposing the input image into plane regions and edge regions according to a predetermined fixed threshold, wherein the plane regions and the edge regions are labeled on the input image with labels which are used to instruct a magnification process of the original input image and the high-frequency portion thereof. Furthermore, the composite up-scaling module executes the magnification processes on the original input image and the high-frequency portion thereof, respectively, wherein the magnification process of the plane regions of the original input image and the high-frequency portion is based on a simple interpolation, such as bicubic interpolation, while the magnification process of the edge regions of the original input image and the high-frequency portion is based on both a smart interpolation and the simple interpolation. In the smart interpolation, a magnification process is executed on pixels of the edge regions and the high-frequency portion through a directional interpolation. Following that, a confidence process is executed on a result of the directional interpolation, wherein the result of the directional interpolation has higher confidence if an edge direction is clearer, and lower confidence if the edge direction is less clear. Then, the result of the directional interpolation and a result of the simple interpolation are processed by a weighted summation according to the confidence previously obtained. Finally, magnification results of the original input image and the high-frequency portion are obtained and processed by a fusion process, so as to output an output image having sharp but not blocky edges, rich details and strong contrast according to the predetermined magnification ratio, thereby lowering the loading and complexity of the operations and enhancing the speed thereof.

Another object of the present invention is to provide the foregoing method for magnifying images and videos, wherein the preprocess module executes a mess removing process on edge pixels in the edge regions after decomposing the input image into the plane regions and the edge regions and labeling both the plane regions and the edge regions on the input image. The mess removing process is performed by firstly extracting a neighborhood area having a predetermined range of a certain selected edge pixel, and then calculating the number of edge pixels within the neighborhood area. If the number of the edge pixels within the neighborhood area is not equal to a predetermined number, the selected edge pixel is deleted so as to remove messy edge pixels within the neighborhood area.

A further object of the present invention is to provide the foregoing method for magnifying images and videos, wherein the preprocess module executes a morphological dilation process on the edge regions after completing the mess removing process, so as to expand the edge regions.

A further object of the present invention is to provide the foregoing method for magnifying images and videos, wherein the directional interpolation is executed according to gradient values of the certain selected edge pixel, so as to evaluate an edge direction thereof and then obtain the pixels within the neighborhood area along the edge direction for executing the directional interpolation. Furthermore, the method further includes executing the weighted summation on the results of the directional interpolation and the simple interpolation in the neighborhood area, in order to increase the robustness of the directional interpolation and thereby prevent the generation of incorrect ghost points in regions having unclear edge directions.

A further object of the present invention is to provide the foregoing method for magnifying images and videos, wherein the method further includes executing a sharpening process on the image, in order to solve the problem of blurry edges in a magnified output image caused by low-pass filtering of an interpolation amplification function used in interpolation. Moreover, the method uses a finite impulse response (FIR) filter capable of non-linear high-pass filtering to perform the sharpening process on the output image, thereby effectively preventing the edge overshoot phenomenon during the sharpening process and preserving the quality of the original image as much as possible, because the filter limits a high-pass filtering result between a maximum value and a minimum value in a partial neighborhood area. In comparison with the traditional amplification methods, the method of the present invention not only generates magnified output images having higher clarity, better visual effect, sharper edges, less blocky edges, richer details and stronger contrast, but also reduces calculation loading.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION

Figure 1:
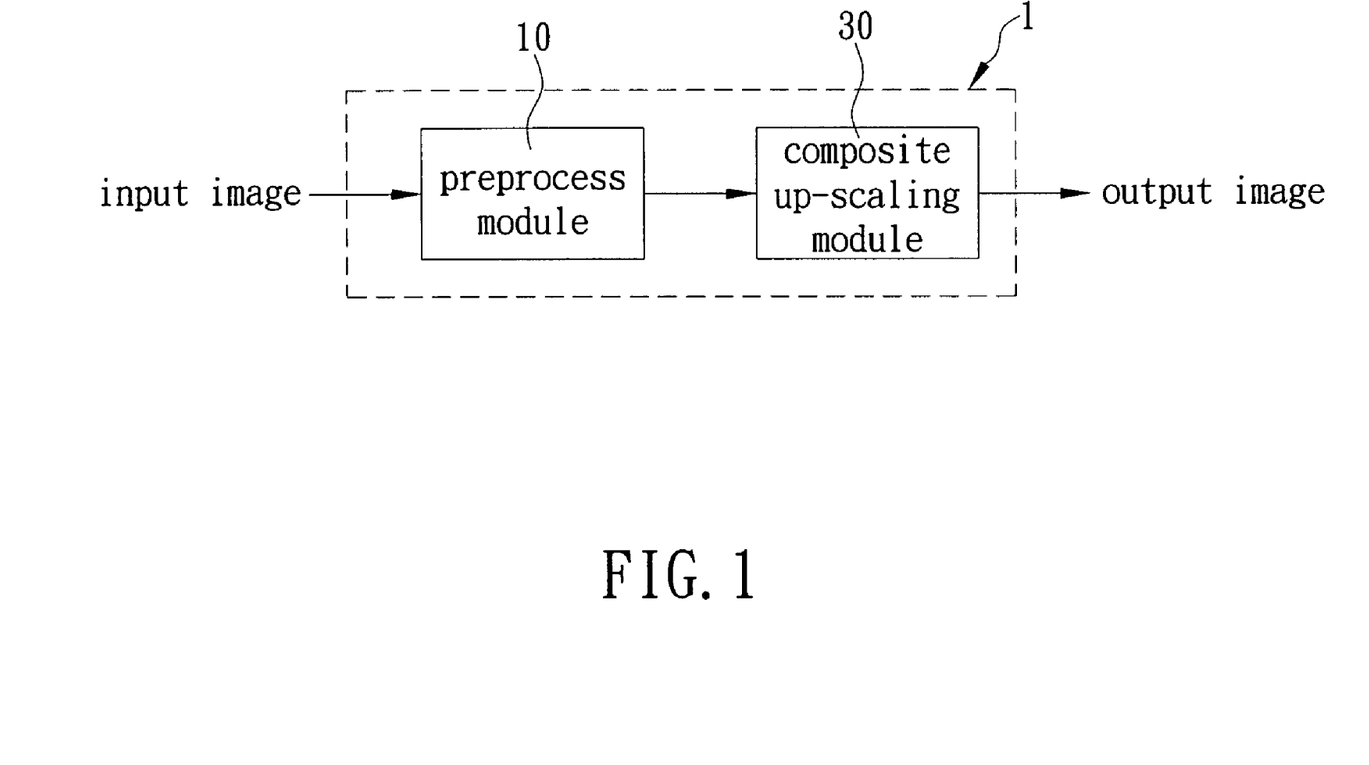
FIG. 1 is a schematic view of an image processing device according to the present invention.
Figure 2:
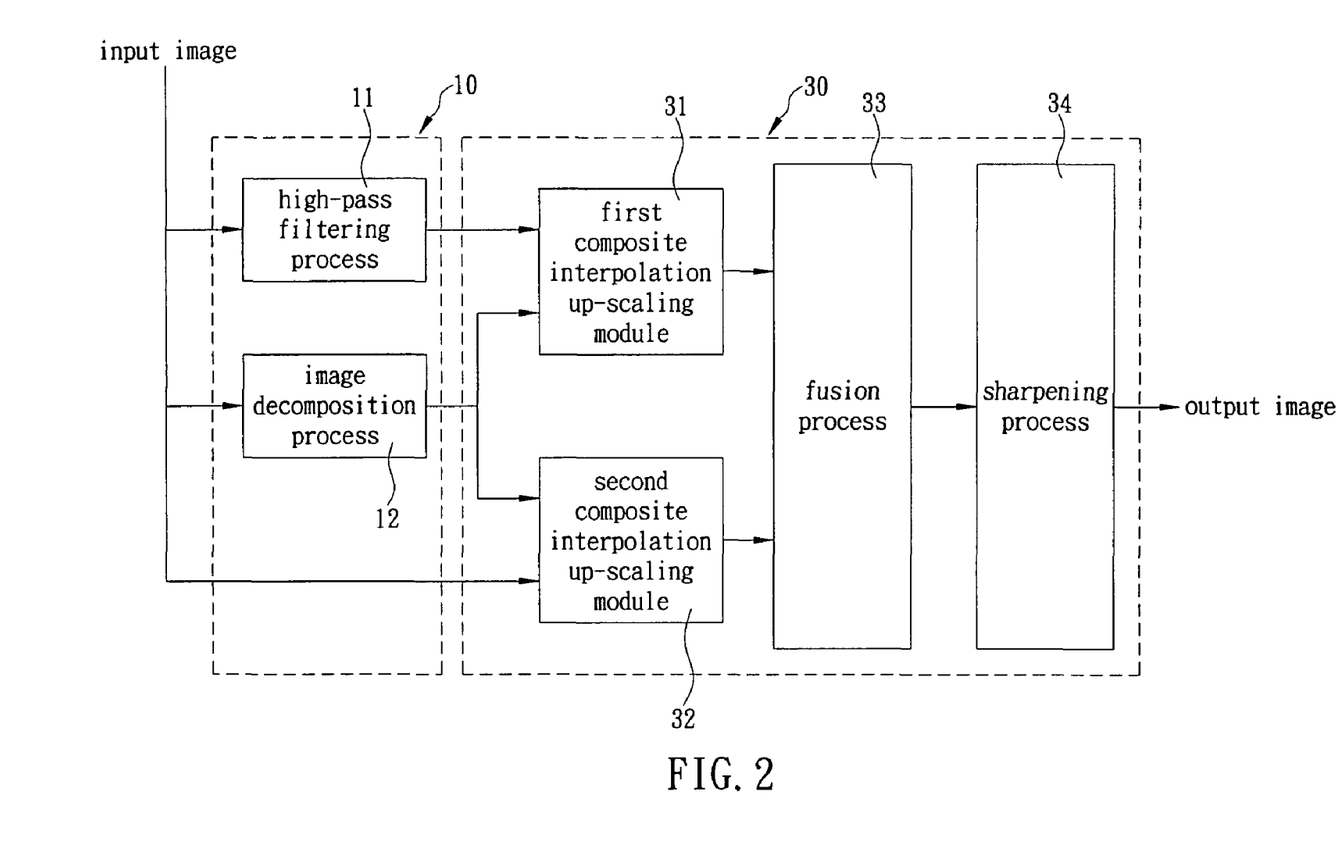
FIG. 2 is a detailed schematic view of the image processing device according to the present invention.

Referring now to FIG. 1 in which a method for magnifying images and videos according to the present invention is illustrated, the method is applicable to an image processing device 1 so that the image processing device 1 can output a magnified digital image according to a predetermined magnification ratio after a digital image is input into the image processing device 1. Thus, when a low-resolution input image and video are magnified and shown on a high-resolution video-frequency apparatus, a clear digital image can be displayed to facilitate identification of characteristics shown in the image. In a preferred embodiment of the present invention, as shown in FIG. 1, the method includes the steps of providing a preprocess module 10 and providing a composite up-scaling module 30. Referring now to FIG. 2, the preprocess module 10 executes a high-pass filtering process 11 on an input image so as to extract a high-frequency portion of the input image, wherein the high-frequency portion is used to perform high-frequency compensation on a magnification result of the input image during subsequent processes. The preprocess module 10 further executes an image decomposition process 12 on the input image so as to decompose the input image into plane regions and edge regions by using a gradient operator, wherein the plane regions and the edge regions are labeled on the input image with labels which are used to instruct a magnification process of the original input image and the high-frequency portion thereof. Furthermore, the composite up-scaling module 30 executes the magnification process on the original input image and the high-frequency portion thereof, respectively, wherein the magnification process of the plane regions of the original input image and the high-frequency portion is based on a simple interpolation, while the magnification process of the edge regions of the original input image and the high-frequency portion is based on a smart interpolation. Finally, magnification results of the original input image and the high-frequency portion are processed by a fusion process 33, so as to output an output image according to the predetermined magnification ratio.

Since the traditional interpolation magnification techniques generally produce a low-pass filtering effect, high-frequency information of an input image will inevitably be lost after the image is magnified and output. According to the preferred embodiment of the present invention shown in FIG. 1, in order to prevent excessive loss of the high-frequency information and prepare for subsequent processes, the preprocess module 10 executes the high-pass filtering process 11 of FIG. 2 on the input image for extracting the high-frequency portion of the input image. During the magnification process of the input image, the high-frequency portion and the original input image are magnified using the same interpolation algorithm. After the original input image and the high-frequency portion are magnified, both of them are processed by the fusion process 33 to compensate for a high-frequency portion of the input image lost during magnification thereof.

Figure 3:
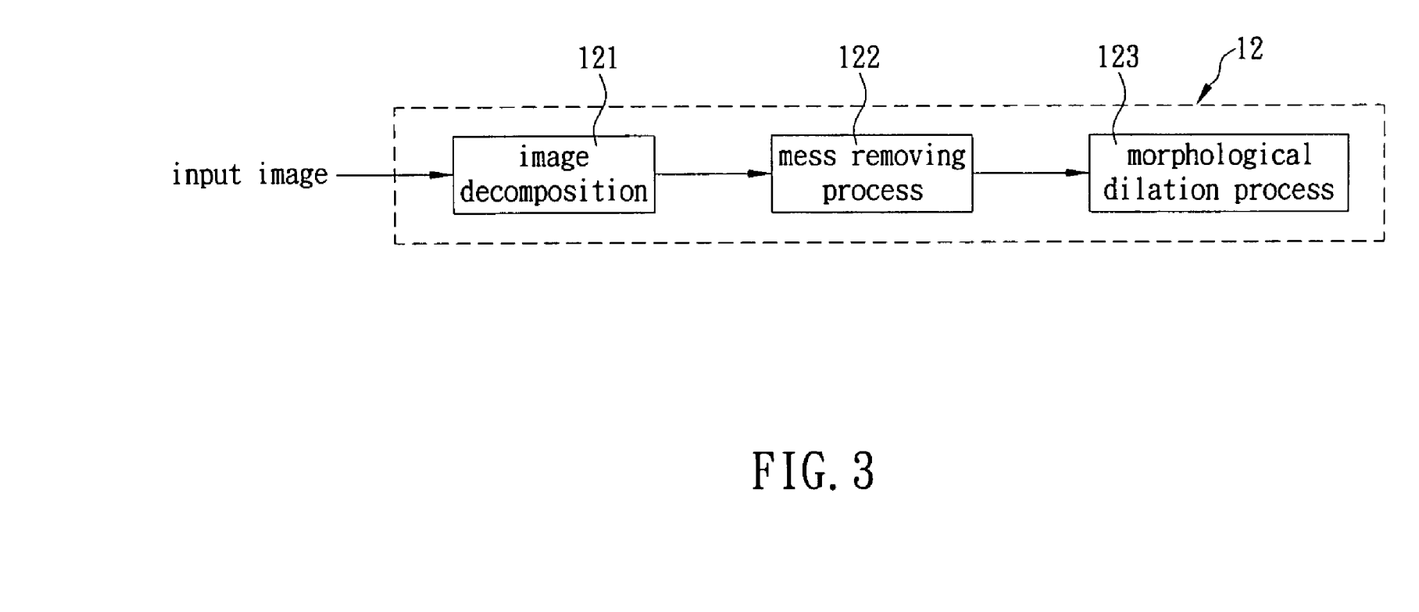
FIG. 3 is a detailed schematic view of an image decomposition process according to the present invention.

Furthermore, since the human eyes are particularly sensitive to edge regions with large gradient in an image, in the preferred embodiment of the present invention, the smart interpolation (such as directional interpolation) is used only on the edge regions, to which the human eyes are particularly sensitive, so as to perform high-precision magnification, thereby decreasing the operation loading of subsequent interpolation magnification as well as simplifying and accelerating the entire operation. On the other hand, the simple interpolation (such as bicubic interpolation) is used to magnify the plane regions in the image. Nevertheless, the foregoing approach provides a clear magnified image without compromising its visual effect. Besides, since messy edge regions in the image (such as edges of a meadow) generally have edge directions difficult to be precisely determined, and the human eyes pay little attention to the precision of magnification results of such messy edge regions, in the preferred embodiment of the present invention, the simple interpolation is also applied to the mess edge regions to lower the complexity and operation loading of interpolation magnification. For this purpose, referring now to FIG. 3, when the image decomposition process 12 is executed on the input image according to the preferred embodiment of the present invention, the input image is firstly processed by an image decomposition 121 for decomposing the input image into the plane regions and the edge regions in the following manner. A gradient operator is used to extract a gradient Grd(x) of the input image. In the preferred embodiment of the present invention, a Sobel operator is used as the gradient operator to extract the gradient Grd(x) of the input image. Then, a fixed threshold ThreshD is set at 16 according to the sensitivity of the human eyes to gradient variation, and the input image is decomposed into the plane regions and the edge regions according to the following function (1), wherein pixels of the input image are labeled by labels Label(x):

$$\text{Label}(x) = \begin{cases} Edge_iA & \text{if } (Grd(x) \geq ThreshD) \\ Plane_iA & \text{if } (Grd(x) < ThreshD) \end{cases} \quad (1)$$

Following that, referring again to FIG. 3, a mess removing process 122 is executed on messy edge pixels in the edge regions for removing the messy edge pixels, as explained below. Firstly, a neighborhood area M×N having a predetermined range of a certain selected edge pixel is extracted, and then the number Nedge of edge pixels within the neighborhood area is calculated. If the number of the edge pixels within the neighborhood area is not equal to (more than or less than) a predetermined number, the selected edge pixel is deleted according to the following function (2):

if (Nedge>ThrH or Nedge<ThrL) remove the edge; (2)

wherein ThrL=min(M,N) and ThrH=0.8·M·N. Finally, referring still to FIG. 3, in the preferred embodiment of the present invention, a morphological dilation process 123 is executed on the selected edge pixel to dilate the selected edge pixel outward and thereby expand the corresponding edge region. In the preferred embodiment, the morphological dilation process 123 is executed on the selected edge pixel by means of a cross-structure element so as to expand the corresponding edge region.

Referring back to FIGS. 1 and 2, in the preferred embodiment of the present invention, the composite up-scaling module 30 executes a magnification process on the original input image, the plane regions, the edge regions and the high-frequency portion, respectively, wherein a first composite interpolation up-scaling module 31 is used to execute interpolation magnification and a gain process on the edge regions and the high-frequency portion, while a second composite interpolation up-scaling module 32 is used to execute interpolation magnification on the original input image and the plane regions. The first and second composite interpolation up-scaling modules 31 and 32 may use an identical interpolation magnification algorithm. In actual operation, interpolation magnification operations of the first and second composite interpolation up-scaling modules 31 and 32 can be simultaneously executed to reduce the entire operation loading. Finally, the fusion process 33 is executed on images output from the first and second composite interpolation up-scaling modules 31 and 32 according to the following function (3), so as to generate a high-resolution output image according to the predetermined magnification ratio:

HR(x)=LR(x)*Hp(x)*CUp(x)·Gain+LR(x)*CUp(x) (3)

wherein HR(x) is the high-resolution output image, LR(x) is the low-resolution input image, Hp(x) is a high-pass filtering function used by the preprocess module 10, CUp(x) is an interpolation magnification function used by the first and second composite interpolation up-scaling modules 31 and 32, and Gain is a constant gain factor used by the first composite interpolation up-scaling module 31.

Figure 4:
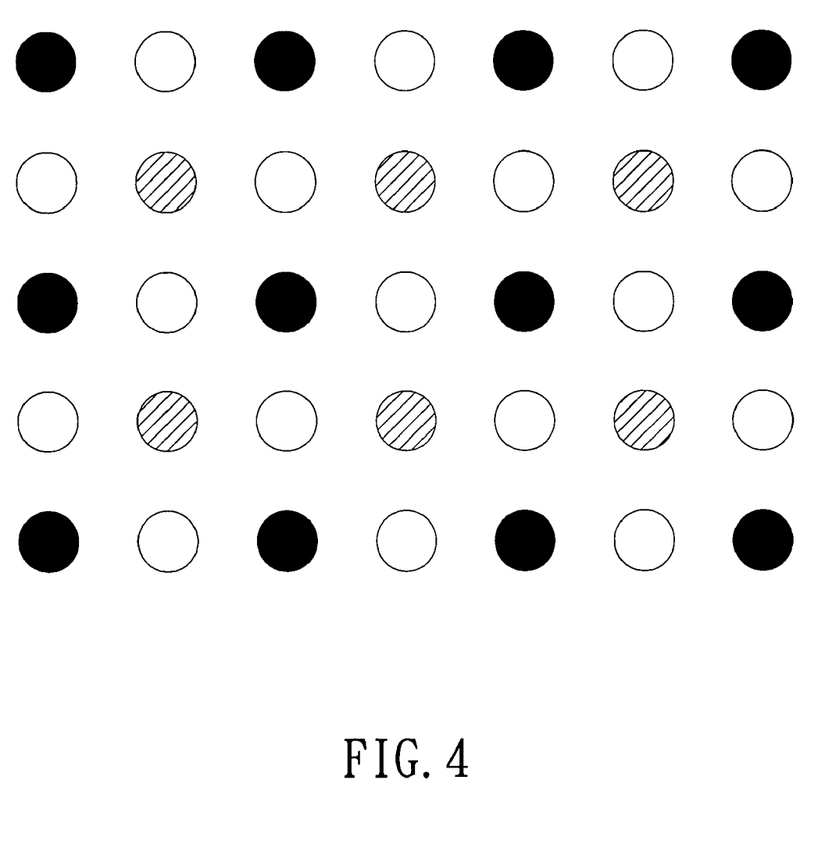
FIG. 4 is a schematic view of a high-resolution image obtained from interpolation magnification according to a preferred embodiment of the present invention.

Generally, the first and second composite interpolation up-scaling modules 31 and 32 serve mainly to magnify the input image. The traditional interpolation magnification techniques can only magnify the input image at an even-power (i.e. $2^n$ times, n=1, 2, 3) magnification ratio. If it is desired to magnify the input image at an arbitrary magnification ratio, a downsampling technique must be used. Taking a magnification ratio of two for example, the function of the first and second composite interpolation up-scaling modules 31 and 32 is described as follows. Referring to FIG. 4 for a high-resolution image obtained from interpolation magnification, the black pixels shown in the drawing are directly copied from the low-resolution input image, while the other pixels are interpolated from the black pixels. In the interpolation magnification process of the present invention, the grey pixels in FIG. 4 are calculated first, followed by the white pixels. In addition, according to the present invention, different interpolation magnification algorithms are used for the edge regions and the plane regions of the original input image. More specifically, the smart interpolation (such as directional interpolation) is used for magnifying the edge region, while the simple interpolation (such as bicubic interpolation) is used for magnifying the plane regions.

Figure 5:
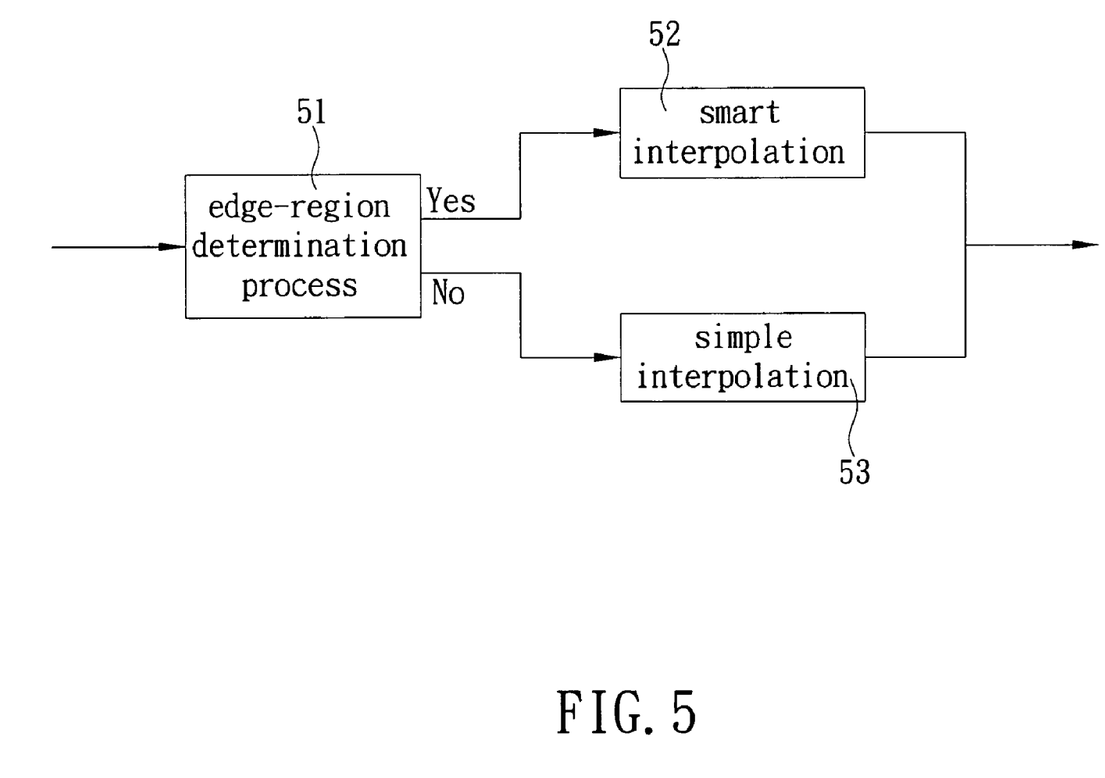
FIG. 5 is a schematic view of a first composite interpolation up-scaling module and a second composite interpolation up-scaling module according to the preferred embodiment of the present invention.
Figure 6:
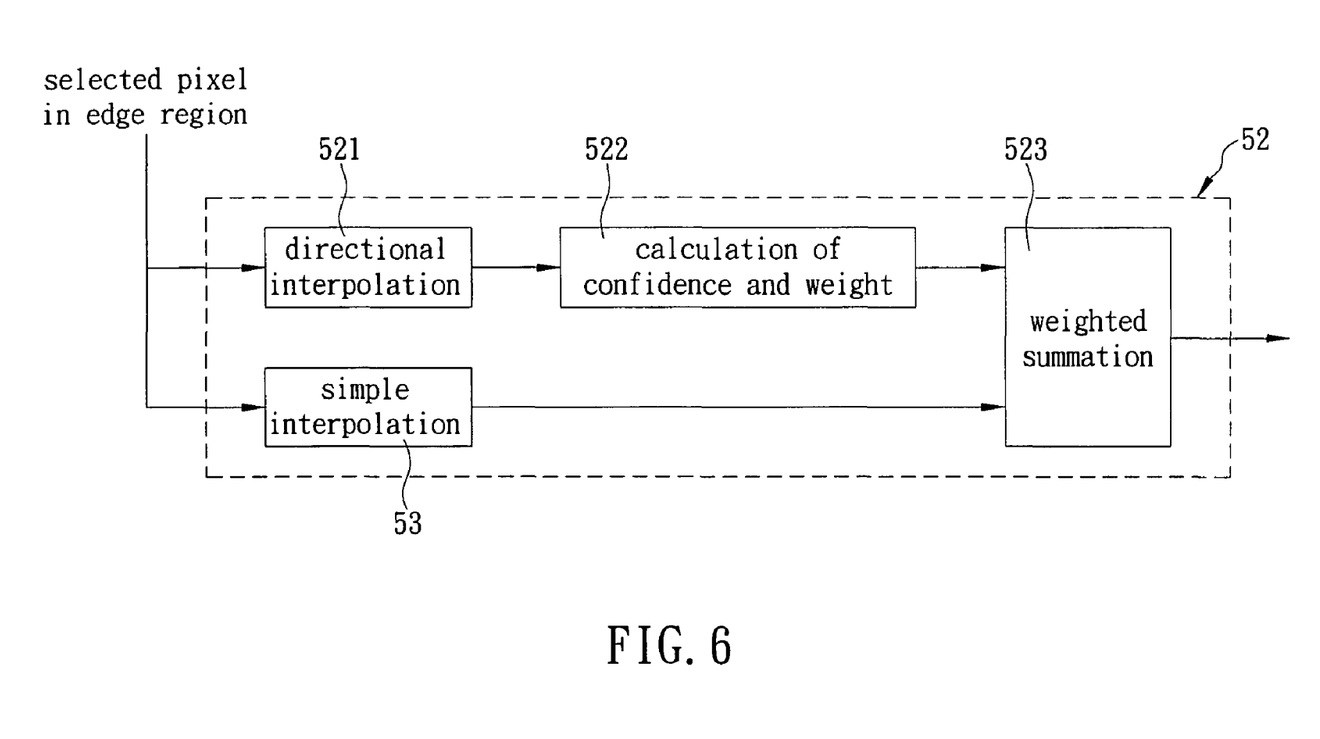
FIG. 6 is a detailed schematic view of a smart interpolation magnification according to the preferred embodiment of the present invention.

In the preferred embodiment of the present invention, the first composite interpolation up-scaling module 31 executes an interpolation magnification process on the high-frequency portion output from the preprocess module 10 according to the labels of image regions output from the preprocess module 10. On the other hand, the second composite interpolation up-scaling module 32 executes an interpolation magnification process on the original input image according to the labels of image regions output from the preprocess module 10. Referring now to FIG. 5, the first and second composite interpolation up-scaling modules 31 and 32 may use the same interpolation magnification algorithm, except that magnification result of the first composite interpolation up-scaling module 31 is further processed by a gain process. Since the preprocess module 10 has labeled the edge regions and the plane regions of the original input image with the pertinent labels, the first and second composite interpolation up-scaling modules 31 and 32 executes an edge-region determination process 51 on the pixels in the image according to the labels. A smart interpolation 52 is applied to a pixel within a region labeled as the edge region, while a simple interpolation 53 (such as bicubic interpolation) is applied to a pixel within a region labeled as the plane region. Refer now to FIG. 6 for an operational structure of the smart interpolation 52. To begin with, a directional interpolation 521 and the simple interpolation 53 (such as bicubic interpolation) are executed simultaneously on a selected pixel in an edge region. Then, a calculation 522 of confidence and weight is executed on a result of the directional interpolation 521. The principle for the calculation of confidence is that the clearer an edge direction is, the higher confidence the result of the directional interpolation 521 will have; and the less clear the edge direction is, the lower confidence the result of the directional interpolation 521 will have. Finally, the result of the directional interpolation 521 and a result of the simple interpolation 53 are processed by a weighted summation 523 according to the confidence obtained from the calculation 522 of confidence and weight, and then output.

Figure 7:
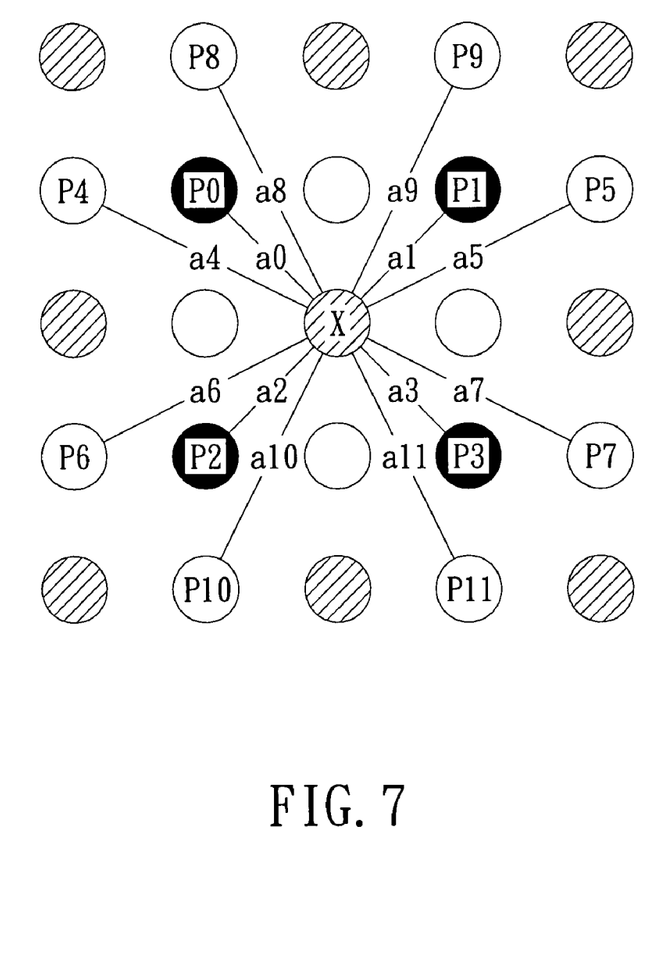
FIG. 7 is a schematic view of a high-resolution image obtained from directional interpolation according to the preferred embodiment of the present invention.

In the preferred embodiment of the present invention, the directional interpolation 521 is executed according to gradient values of a selected pixel in an edge region, so as to evaluate an edge direction of the selected pixel and then obtain other pixels along the edge direction for executing interpolation magnification. Referring now to FIG. 7, a grey point x is used as an example for explaining how to use the directional interpolation 521 to get the interpolated pixel value, and rotate an interpolation sample of the grey point x by 45 degrees so as to obtain the white pixels in FIG. 7.

Firstly, referring to FIG. 7, an interpolation calculation DPx is executed on twelve pixels $P_0$~$P_{11}$ in a neighborhood area of the grey pixel x according to the following function (4). Since the interpolation calculation DPx is performed along six directions and the pixels $P_0$~$P_{11}$ are arranged in a generally circular pattern, the interpolation calculation DPx has high precision.

$$DPx = \sum_{i=0}^{11} a_i \cdot P_i, \sum_{i=0}^{11} a_1 = 1 \qquad (4)$$

wherein $a_i$ is a weighting coefficient of each of the 12 pixels $P_0$~$P_{11}$ (i.e., $P_i$) in the neighborhood area. A gradient value in each of the six directions is calculated according to the following function (5):

$$Dir_0=|P_0-P_3|, Dir_1=|P_1-P_2|, Dir_2=|P_4-P_7|,$$
$$Dir_3=|P_5-P_6|, Dir_4=|P_8-P_{11}|, Dir_5=|P_9-P_{10}| \qquad (5)$$

If some of the pixels $P_0$~$P_{11}$ in the function (5) are yet to be determined, the simple interpolation 53 (such as bicubic interpolation) can be used to calculate substitute values for those undetermined pixels. Following that, the gradient values are used to calculate the weighting coefficient $a_i$ of each pixel according to the following function (6):

$$Dir_{min} = \min(Dir_0, \dots Dir_5), \qquad (6)$$

$$\begin{cases} \text{if } (Dir_{min} = Dir_0) & a_0 = a_3 = 0.5, \text{ other } a_i = 0 \\ \text{if } (Dir_{min} = Dir_1) & a_1 = a_2 = 0.5, \text{ other } a_i = 0 \\ \text{if } (Dir_{min} = Dir_2) & a_4 = a_7 = 0.5, \text{ other } a_i = 0 \\ \text{if } (Dir_{min} = Dir_3) & a_5 = a_6 = 0.5, \text{ other } a_i = 0 \\ \text{if } (Dir_{min} = Dir_4) & a_8 = a_{11} = 0.5, \text{ other } a_i = 0 \\ \text{if } (Dir_{min} = Dir_5) & a_9 = a_{10} = 0.5, \text{ other } a_i = 0 \end{cases}$$

After the weighting coefficients $a_i$ are obtained, the result of the directional interpolation 521 and the result of the simple interpolation 53 are processed by the weighted summation 523 according to the function (4), so as to calculate and output the result of DPx of the smart interpolation 52.

In addition, referring back to FIG. 2, in order to increase the robustness of the directional interpolation 521 and thereby prevent the generation of incorrect ghost points in an edge region with an unclear edge direction, according to the present invention, the fusion process 33 is further executed on the magnification results from the simple interpolation and from the directional interpolation of the first and second composite interpolation up-scaling modules 31 are 32 according to the following function (7), so as to output a high-resolution output image according to a predetermined magnification ratio:

$$HPx=(1-f\text{Mix})\cdot SPx+f\text{Mix}\cdot DPx \qquad (7)$$

wherein HPx is a pixel value of the output image; SPx is the magnification result from the simple interpolation of pixels of the input image; DPx is the magnification result from the directional interpolation of the pixels of the input image; and fMix is a fusion coefficient obtained from the following function (8):

$$Dir_{mean} = \sum_{i=0}^{5} \frac{Dir_i}{6}, \tag{8}$$

$$\begin{cases} \text{if } (Dir_{min} \cdot 2 > Dir_{mean}) & fMix = 0.25 \text{ F} \\ \text{else if } (Dir_{min} \cdot 4 > Dir_{mean}) & fMix = 0.5 \text{ F} \\ \text{else } fMix = 1. \end{cases}$$

Moreover, referring again to FIG. 2, since all the interpolation magnification functions used in the foregoing interpolation magnification processes produce a low-pass filtering effect, which causes blurry edges in a magnified image, the method of the present invention further includes a sharpening process 34 to be executed on the image, in order to increase the clarity of edges of the magnified image. Meanwhile, the method of the present invention uses a non-linear high-pass filter (as shown in the following function (9), such as a finite impulse response (FIR) filter) to prevent the edge overshoot phenomenon from occurring during the sharpening process 34:

$$SHP(x) = \text{Median}(LocMax(x), LocMin(x), Fir(x)) \tag{9}$$

wherein SHP(x) is a sharpened result; Median(LocMax(x), LocMin(x),Fir(x)) is a function for taking median; LocMax(x) and LocMin(x) are a maximum value and a minimum value in the neighborhood area of the selected pixel, respectively; and Fir(x) is a FIR filter capable of non-linear high-pass filtering. Thus, by limiting a high-pass filtering result between the maximum value and the minimum value in a partial neighborhood area, the edge overshoot phenomenon is effectively prevented during the sharpening process 34.

Therefore, when the method of the present invention is used to magnify a lower-resolution input image, so as to produce a magnified output image for display on a high-resolution video-frequency apparatus, not only is the operation loading lower than that of the traditional edge-based magnification techniques, but also the magnified output image shows sharper but not blocky edges, richer details and stronger contrast, despite the fact that the method of the present invention involves less complex operations and is performed at a higher speed. Furthermore, when magnifying a digital image, the method of the present invention effectively decreases image distortion and provides a high-resolution output digital image that facilitates identification of characteristics shown therein.

If the above method for magnifying images and videos is implemented by software, then the execution of this method can be accelerated with the help of hardware. More specifically, the preprocess module 10 and the composite up-scaling module 30 in FIG. 1 are implemented by software program codes, which can then be executed by the hardware of a graphic processing unit (GPU). If the GPU supports general purpose parallel computing, i.e. the GPU is a General Purpose GPU (GPGPU), then the program codes can be executed more quickly to upgrade the magnification efficiency of images and videos. For example, if the GPU supports the Compute Unified Device Architecture (CUDA, developed by NVIDIA Corp.) technology, then the above-mentioned operations executed by the preprocess module 10 and the composite up-scaling module 30, such as the high-pass filtering process 11, the simple interpolation 53, the smart interpolation 52, the fusion process 33, the sharpening process 34 . . . etc., can be coded as program codes of CUDA kernel functions. When the CUDA-supported GPU executes the CUDA kernel functions, multiple threads can be generated to simultaneously execute the same CUDA kernel function, thereby substantially upgrading the execution efficiency.

Figure 8A:
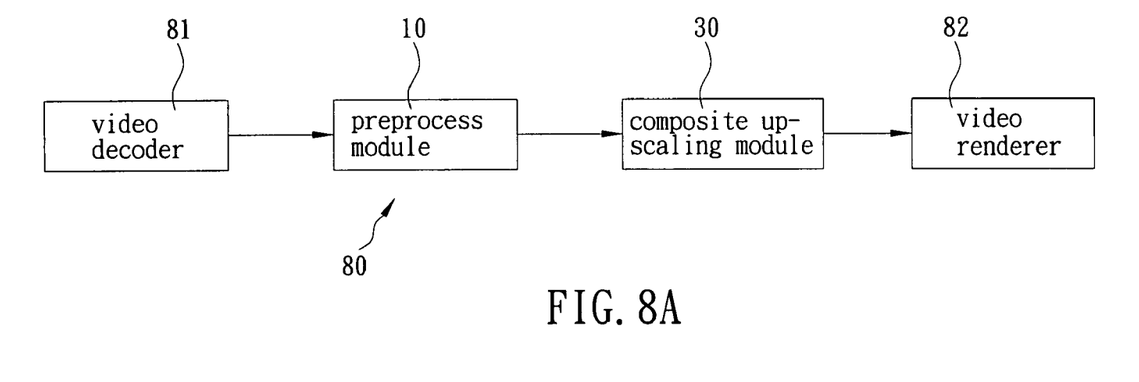
FIG. 8A is a diagram showing the architecture of a video player software.

The above method for magnifying images and videos can be applied to image post processing, e.g. the video player software, as shown in FIG. 8A. FIG. 8A shows an architecture of the video player software, where the video player 80 comprises a video decoder 81, the preprocess module 10, the composite up-scaling module 30 and a video renderer 82. The video decoder 81 acquires image data from various video sources and decodes the acquired image data; the preprocess module 10 and the composite up-scaling module 30 magnify the decoded image data; the video renderer 82 applies image rendering technology, such as the Direct3D technology of Microsoft, to display the magnified image data.

Figure 8B:
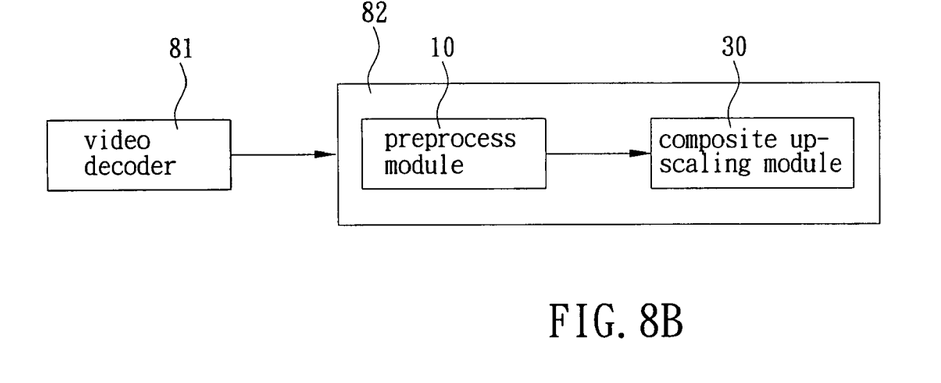
FIG. 8B is a diagram showing that the preprocess module and the composite up-scaling module of FIG. 8A are integrated into the video renderer.

Generally, when the architecture of FIG. 8A is implemented in the computer, the video decoder 81 stores decoded image data into the system memory of the computer, and the preprocess module 10 and the composite up-scaling module 30 magnify the decoded image data stored in the system memory. The preprocess module 10 and the composite up-scaling module 30 can also be integrated into the video decoder 81. However, if the computer includes the CUDA-supported. GPU and also the preprocess module 10 and the composite up-scaling module 30 are implemented by the program codes of the CUDA kernel functions, then the effect of hardware acceleration can be further upgraded by integrating the preprocess module 10 and the composite up-scaling module 30 into the video renderer 82, as shown in FIG. 8B. This is because when the video decoder 81 transfers the decoded image data to the video renderer 82, the video renderer 82 would establish Direct3D surfaces (here the Direct3D technology is taken as example) for displaying the image data, while the Direct3D surfaces are stored in the video memory. On the other hand, the CUDA technology supports Direct3D interoperability mechanism so that the preprocess module 10 and the composite up-scaling module 30 can process the Direct3D surfaces directly. Thus, if the preprocess module 10 and the composite up-scaling module 30 are integrated into the video renderer 82 to enable it to directly magnify the Direct3D surfaces stored in the video memory, then the magnifying efficiency can be upgraded and the time consumed in data transmission between the system memory and the video memory can be reduced.

Figure 9:
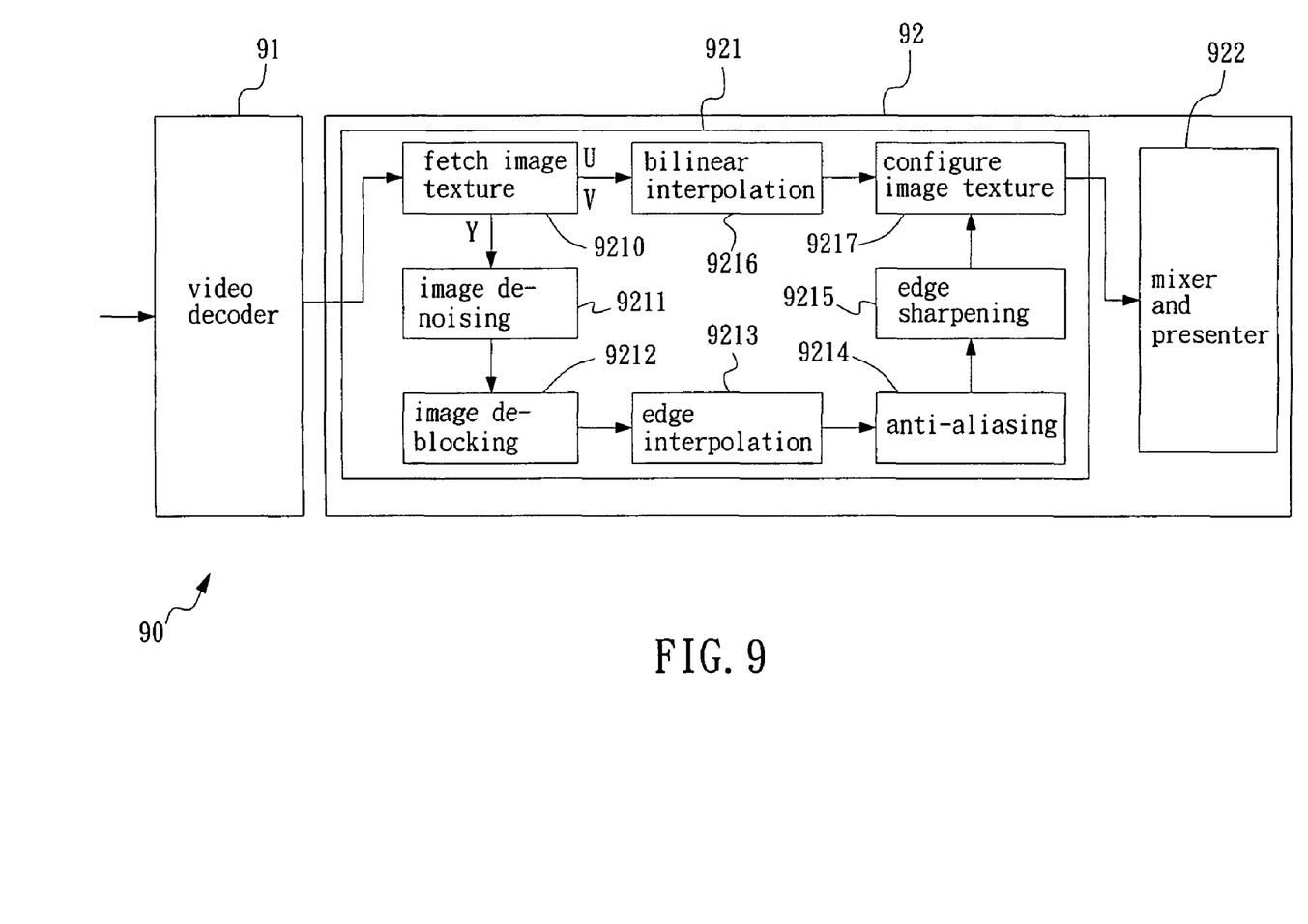
FIG. 9 is a block diagram of an embodiment of the video player software architecture in FIG. 8B.

FIG. 9 is a block diagram of an embodiment of the video player software architecture in FIG. 8B. As shown in FIG. 9, the video player 90 comprises a video decoder 91 and a video renderer 92 which includes a magnifying module 921 and a mixer and presenter 922. The architecture of FIG. 9 is implemented by the CUDA-supported GPU, and the magnifying module 921 is implemented by the program codes of the CUDA kernel functions. After receiving decoded image data from the video decoder 91, the video renderer 92 establishes Direct3D surfaces and stores them into the video memory. The block 9210 in the magnifying module 921 fetches image texture from the Direct3D surfaces stored in the video memory and divides it into a luminance component (i.e. Y component) and a chrominance component (i.e. U/V component) so as to perform different magnifying operations thereon. The following operations will be performed on the luminance component in order: image de-noising (block 9211), image de-blocking (block 9212), edge interpolation (block 9213), anti-aliasing (block 9214), and edge sharpening (block 9215). The chrominance component will be performed bilinear interpolation (block 9216). Then, the magnifying module 921 configures the image texture to be displayed according to the magnified luminance and chrominance components (block 2017), and sends the result to the mixer and presenter 922. The blocks 9211~9216 can be implemented by coding proper CUDA kernel functions. Thus, the GPU can execute the CUDA kernel functions in the manner of parallel computing, so as to substantially upgrade the operation efficiency of the magnifying module 921.

While the present invention has been shown and described with reference to the preferred embodiments thereof and the illustrative drawings, it should not be considered as limited thereby. Various possible modifications and alterations can be conceived by persons skilled without departing from the scope and the spirit of the present invention.

What is claimed is:

1. A method for magnifying images and videos, applicable to an image processing device so that, upon inputting of a digital image thereinto, the image processing device outputs a magnified digital image according to a predetermined magnification ratio, the method comprising steps of:

providing a preprocess module for executing a high-pass filtering process on the input digital image so as to extract a high-frequency portion thereof, wherein the high-frequency portion is used to perform high-frequency compensation on a magnification result of the input digital image; and for executing an image decomposition process on the input digital image so as to extract an image gradient of the input digital image by using a gradient operator and decomposing the input digital image into plane regions and edge regions according to a predetermined fixed threshold, wherein the plane regions and the edge regions are labeled on the input digital image with labels;

providing a composite up-scaling module for executing a magnification process on the original input digital image and the plane regions based on a simple interpolation; for executing the magnification process on the edge regions and the high-frequency portion based on both a smart interpolation and the simple interpolation; for subsequently executing a confidence process on a result of the smart interpolation, wherein the result of the smart interpolation has higher confidence if an edge direction is clearer, and lower confidence if the edge direction is less clear; and for finally executing a weighted summation on the result of the smart interpolation and a result of the simple interpolation according to said confidence; and executing a fusion process by which the magnification results of the original input digital image, the plane regions, the edge regions and the high-frequency portion are fused to form the output magnified digital image;

wherein the preprocess module and the composite up-scaling module are implemented by a program code which is executed by a graphic processing unit (GPU), wherein the GPU supports parallel computing so as to upgrade execution efficiency of the program code.

2. The method of claim 1, wherein the GPU supports a technology of Compute Unified Device Architecture (CUDA).

3. The method of claim 2, wherein the preprocess module and the composite up-scaling module are integrated into a video renderer, wherein the video renderer establishes a Direct3D surface in a video memory, and the preprocess module and the composite up-scaling module fetch the input digital image from the Direct3D surface.

4. An image processing device for magnifying an input digital image to output a magnified digital image according to a predetermined magnification ratio, the image processing device comprising:

a preprocess module for executing a high-pass filtering process on the input digital image to extract a high-frequency portion thereof, wherein the high-frequency portion is used to perform high-frequency compensation on a magnification result of the input digital image; and for executing an image decomposition process on the input digital image so as to extract an image gradient of the input digital image by using a gradient operator and decomposing the input digital image into plane regions and edge regions according to a predetermined fixed threshold, wherein the plane regions and the edge regions are labeled on the input digital image with labels; and a composite up-scaling module for executing a magnification process on the original input digital image and the plane regions based on a simple interpolation; for executing the magnification process on the edge regions and the high-frequency portion based on both a smart interpolation and the simple interpolation; for subsequently executing a confidence process on a result of the smart interpolation, wherein the result of the smart interpolation has higher confidence if an edge direction is clearer, and lower confidence if the edge direction is less clear; and for finally executing a weighted summation on the result of the smart interpolation and a result of the simple interpolation according to said confidence;

wherein the composite up-scaling module executes a fusion process by which the magnification results of the original input digital image, the plane regions, the edge regions and the high-frequency portion are fused to form the output magnified digital image.

5. The image processing device of claim 4, wherein the simple interpolation is a bicubic interpolation.

6. The image processing device of claim 4, wherein the smart interpolation is a directional interpolation.

7. The image processing device of claim 4, wherein the gradient operator is a sobel operator.

* * * * *